(12) United States Patent
Mikhailov (10) Patent No.: US 9,448,410 B2
(45) Date of Patent: Sep. 20, 2016

(54) DEVICE FOR CONVERTING LASER RADIATION INTO LASER RADIATION HAVING AN M PROFILE

(75) Inventor: Aleksei Mikhailov, Dortmund (DE)

(73) Assignee: LIMO PATENTVERWALTUNG GMBH & CO. KG, Dortmund (DE)

( * ) Notice: Subject to any disclaimer, the term of this patent is extended or adjusted under 35 U.S.C. 154(b) by 323 days.

(21) Appl. No.: 13/992,234

(22) PCT Filed: Dec. 8, 2011

(86) PCT No.: PCT/EP2011/072203
§ 371 (c)(1),
(2), (4) Date: Jun. 27, 2013

(87) PCT Pub. No.: WO2012/076651
PCT Pub. Date: Jun. 14, 2012

(65) Prior Publication Data
US 2013/0271830 A1    Oct. 17, 2013

(30) Foreign Application Priority Data

Dec. 8, 2010 (DE) .................. 10 2010 053 781

(51) Int. Cl.
G02B 27/09 (2006.01)
G02B 23/00 (2006.01)
G02B 27/12 (2006.01)
G02B 5/00 (2006.01)

(52) U.S. Cl.
CPC ............. *G02B 27/123* (2013.01); *G02B 5/001* (2013.01); *G02B 27/095* (2013.01); *G02B 27/0927* (2013.01)

(58) Field of Classification Search
CPC .. G02B 5/001; G02B 27/123; G02B 27/095; G02B 27/0927; G02B 23/00; G02B 23/16; G02B 27/145

USPC .......................... 359/399, 618, 619
See application file for complete search history.

(56) References Cited

U.S. PATENT DOCUMENTS 3,534,462 A   10/1970   Cruickshank et al.
3,547,526 A   12/1970   Devereux
(Continued)

FOREIGN PATENT DOCUMENTS

DE   10 2005 017238 A1   10/2006
EP       1 447 993 A1    8/2004
(Continued)

OTHER PUBLICATIONS

Japanese Office Action, Mail No. 336631, Patent App. No. 2013-542543 (corresponding application to U.S. Appl. No. 13/992,234), Jul. 28, 2015, with English translations.
(Continued)

*Primary Examiner* — Stephone B Allen
*Assistant Examiner* — Rahman Abdur
(74) *Attorney, Agent, or Firm* — Cohen & Hildebrand, PLLC (57) ABSTRACT

The invention relates to a device for converting laser radiation (21) into laser radiation having an M profile, comprising separating means (34), which can separate the laser radiation (21) into at least two partial beams (22, 23) which, at least in some sections or partially, move in different directions or are arranged offset from one another, and optics means (38), which can introduce the at least two partial beams (22, 23) in a working plane and/or can, at least in some sections, superimpose the at least two partial beams (22, 23) in the working plane, wherein the separating means (34) comprise a lens array (39, 41) having at least two lenses (40, 42).

11 Claims, 7 Drawing Sheets

(56) References Cited

U.S. PATENT DOCUMENTS

| | | | | |
|---|---|---|---|---|
| 4,961,622 | A | * | 10/1990 | Gorman et al. ............... 385/33 |
| 5,581,408 | A | * | 12/1996 | Schumtz ............ G02B 26/10 |
| | | | | 359/621 |
| 7,692,864 | B2 | * | 4/2010 | Taniguchi ............ G03B 21/56 |
| | | | | 359/618 |
| 2005/0018294 | A1 | | 1/2005 | Hausschild |
| 2006/0146384 | A1 | | 7/2006 | Schultz et al. |
| 2006/0250703 | A1 | | 11/2006 | Chern et al. |
| 2009/0129084 | A1 | | 5/2009 | Tsao |

FOREIGN PATENT DOCUMENTS

| | | |
|---|---|---|
| EP | 1489438 A1 | 12/2004 |
| JP | H5501924 A | 8/1990 |
| JP | 10 282 450 A | 10/1998 |
| WO | 93/14430 A1 | 7/1993 |

OTHER PUBLICATIONS

"Achromatic and Sharp Real Imaging of a Point by a Single Aspheric Lens", Applied Optics, Optical Society of America, Washington, DC, US; vol. 22, No. 20 (Oct. 1, 1983), pp. 3242-3348.

International Search Report dated Mar. 9, 2012 for counterpart PCT International Patent Application Serial No. PCT/EP2011/072203, filed on Dec. 8, 2011 (6 pages).

German Office Action dated Aug. 1, 2011 for counterpart German Patent Applicataion 10 2010 053 781.0, filed on Dec. 8, 2010 (5 pages).

* cited by examiner

DEVICE FOR CONVERTING LASER RADIATION INTO LASER RADIATION HAVING AN M PROFILE

This is an application filed under 35 USC §371 of PCT/EP2011/072203, filed on Dec. 8, 2011, claiming priority to DE 10 2010 053781.0, filed on Dec. 8, 2010.

BACKGROUND OF THE INVENTION

The invention relates to a device for converting laser radiation into laser radiation having an M-profile according to the preamble the claim 1.

DEFINITIONS

In the propagation direction of the laser radiation refers to the average propagation direction of the laser radiation, in particular when the laser radiation is not a plane wave or is at least partially divergent. Laser beam, light beam, partial beam or beam, unless expressly stated otherwise, is not an idealized beam of the geometric optics, but a real light beam, for example a laser beam which does not have an infinitesimally small beam cross-section, but has an extended beam cross-section. M-profile denotes an intensity profile of laser radiation which has a lower intensity in the center of the cross-section than in one or more regions distal from the center.

A device the aforementioned type is disclosed, for example, in WO 93/14430 A1. In the device described therein, an optical fiber is terminated in a conical end section serving as separating means. The laser radiation exiting from this conical end section has an annular intensity distribution, which can be referred to as an M-profile, a short distance behind the optical fiber in a working plane perpendicular to cone axis.

Disadvantageously, the beam quality in the working plane is poor, in particular when the laser radiation coupled into the optical fiber is produced from a laser diode bar or a plurality of laser diode bars.

The underlying problem of the present invention is to provide a device of the aforedescribed type capable of generating laser radiation with an M-profile and with better beam quality.

BRIEF SUMMARY OF THE INVENTION

This is attained according to the invention with a device of the aforedescribed type having a separation device comprising at least one lens array with at least two lenses. The dependent claims recite preferred embodiments of the invention.

According to claim 1, the separating means include at least one lens array with at least two lenses. With the at least one lens array, at least two partial beams propagating in different directions can be produced. In this way, a region of lower intensity or a hole is created in the cross-section the laser radiation, in particular in the center. This region of lower intensity or this hole can be transferred to a working plane or to the entrance face of an optical fiber. This produces in the working plane or at the output of the optical fiber laser radiation with an M-profile and with good beam quality.

The separating means may include at least one substrate that is at least partially transparent and which has an entrance face and an exit face for the laser radiation, wherein the at least one lens array is arranged on the entrance face and/or the exit face.

According to a simple embodiment, the at least one lens array may have concave lenses and may be arranged on the exit face of the at least one substrate, whereas a single convex lens may be provided on the entrance face of the at least one substrate. With this embodiment, for example, the laser radiation from one laser diode bar can be introduced into an optical fiber, with laser radiation with an M-profile then exiting at the output of the optical fiber.

According to another embodiment, the separating means may include at least one first lens array and at least one second lens array, each having at least two lenses, wherein the at least one first lens array is arranged on the entrance face of the at least one substrate and the at least one second lens array is arranged on the exit face the at least one substrate. This embodiment is particularly beneficial when the laser radiation from a plurality of laser diode bars is to be converted.

According to one embodiment, a Galilean telescope or a plurality of Galilean telescopes may be formed by the entrance face and the exit face of the at least one substrate. In this way, a plurality of partial beams, which have the same divergence as the entering laser radiation, can be produced with a suitably selected demagnification of the telescope.

According to another embodiment, the lenses of the at least one lens arrays may be cylindrical lenses.

Furthermore, the entrance face and/or the exit face may have at least two different segments, wherein the cylinder axes of the lenses in a first of the segments are aligned differently from the cylinder axes of the lenses in a second of the segments. With the different segments having cylinder axes with different orientations, a better fill factor of, for example, an optical fiber can be attained.

Additional features and advantages of the present invention will become clear based the following description of preferred embodiments with reference to the appended drawings, which show in:

DETAILED DESCRIPTION OF THE INVENTION

Identical components and functionally identical components, beams or arrows in the Figures have identical reference symbols.

Figure 1:
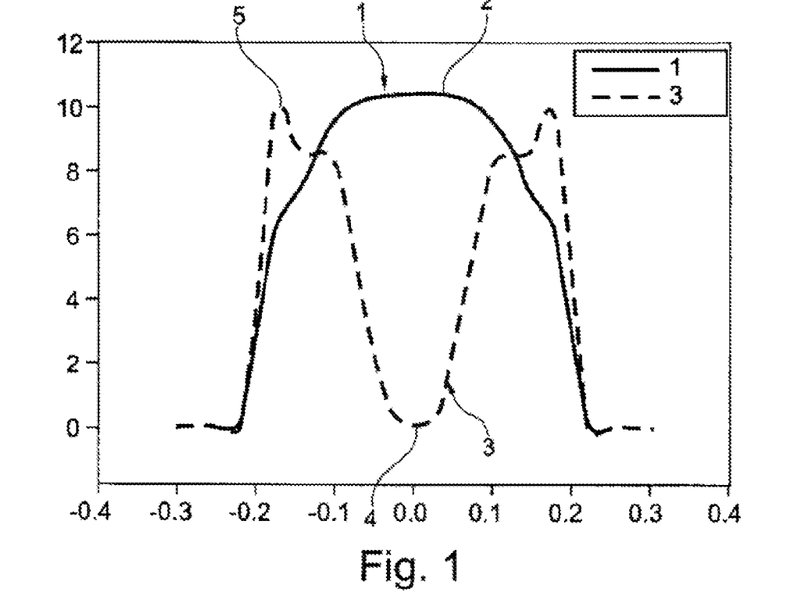
FIG. 1 a comparison of an exemplary profile of a laser beam before and after passage through a device according to the invention, wherein the intensity is plotted against the radius in arbitrary units.

The continuous curve 1 in FIG. 1 shows an exemplary intensity profile of laser radiation emanating, for example, from a laser diode bar and collimated with a typical optical system. Such an intensity profile has in the center of the laser radiation a maximum 2, with the intensity decreasing from the center to the edges.

Conversely, the dashed curve 3 in FIG. 1 shows an intensity profile, which can be generated from the laser radiation according to the continuous curve 1 after passage through a device according to the invention. The intensity profile represented by the dashed curve 3 is an example for an M-profile. The M-profile has a local minimum 4 in the center the beam, whereas maxima 5 of the intensity occur outside the center. For example, such an M-profile is rotationally symmetric with respect to the propagation direction of the laser beam or the laser radiation.

Figure 2:
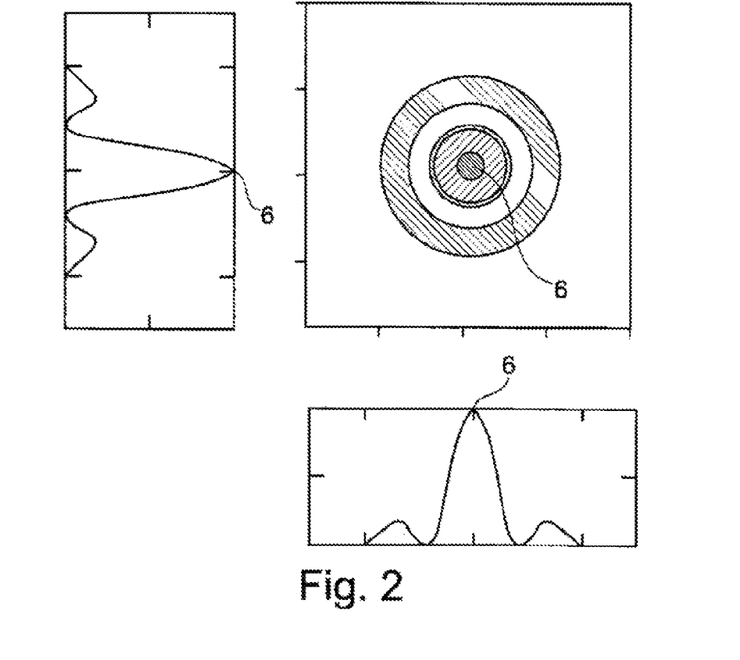
FIG. 2 an exemplary diagram of an intensity distribution of a meridional beam in an optical fiber.
Figure 3:
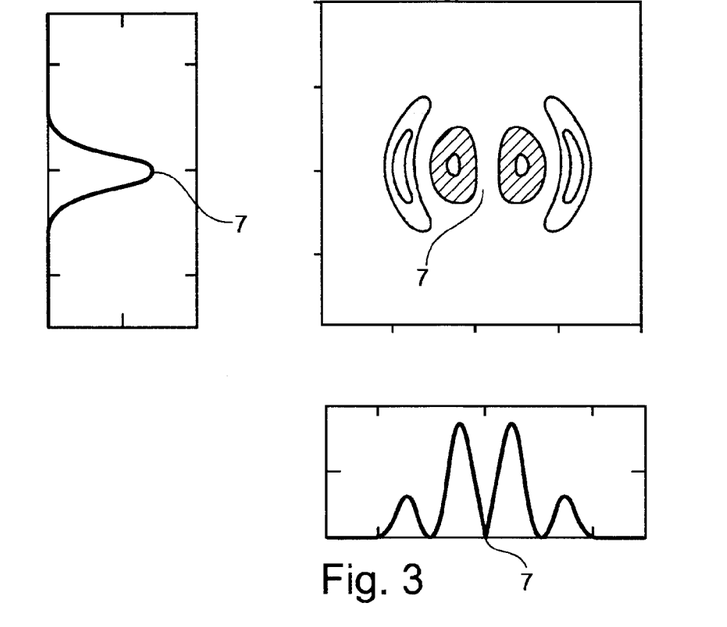
FIG. 3 an exemplary diagram of an intensity distribution of a sagittal beam in an optical fiber.
Figure 4:
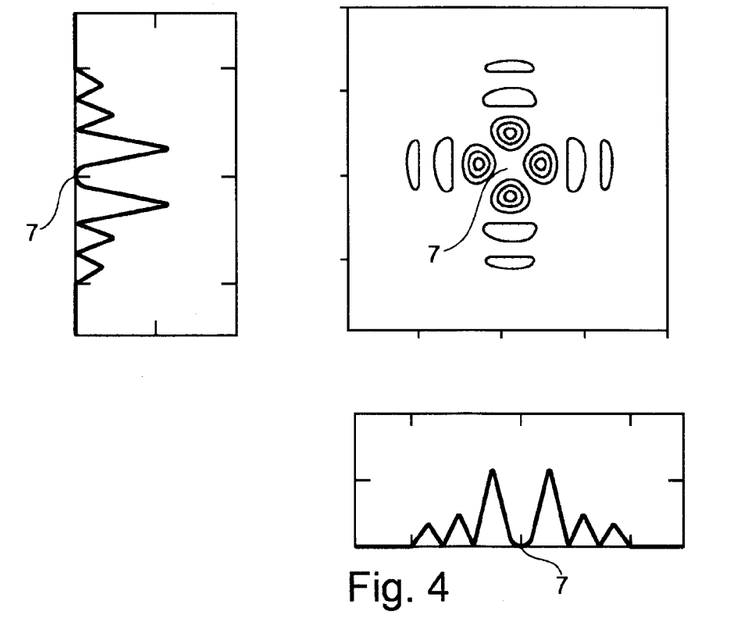
FIG. 4 an exemplary diagram of an intensity distribution of another sagittal beam in an optical fiber.

FIG. 2 illustrates a so-called meridional beam or a so-called meridional mode, respectively, in an optical fiber. A meridional mode has a distinct maximum intensity 6 on the longitudinal axis of the optical fiber. FIG. 3 and FIG. 4 show so-called sagittal beams or so-called sagittal modes, respectively, which each have an intensity minimum 7 in the region of the longitudinal axis of the optical fiber.

Figure 5:
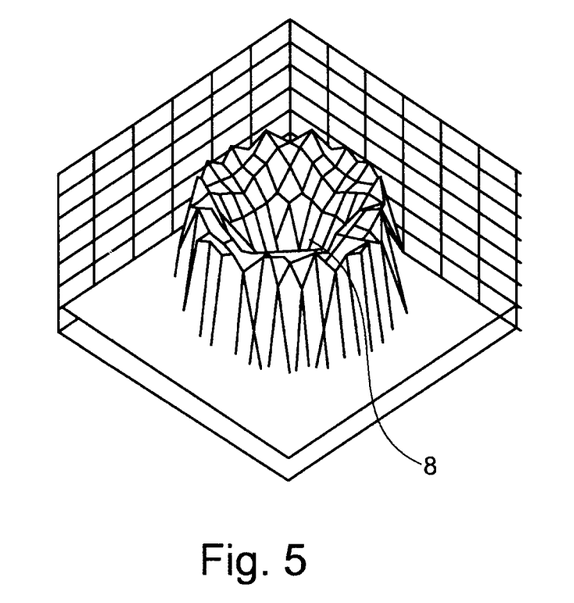
FIG. 5 a three-dimensional diagram of a typical M-profile of a laser beam, wherein the intensity is plotted vertically against the radius in two mutual orthogonal directions.

When a laser beam with an M-profile is to exit at the exit of optical fiber, the beam(s) entering the optical fiber should have only sagittal modes, if possible, or should be able to transform possible meridional modes into sagittal modes. FIG. 5 shows an exemplary laser beam with an M-profile at the exit of an optical fiber. The deep local minimum 8 in the center of the laser beam is clearly visible.

Figure 6:
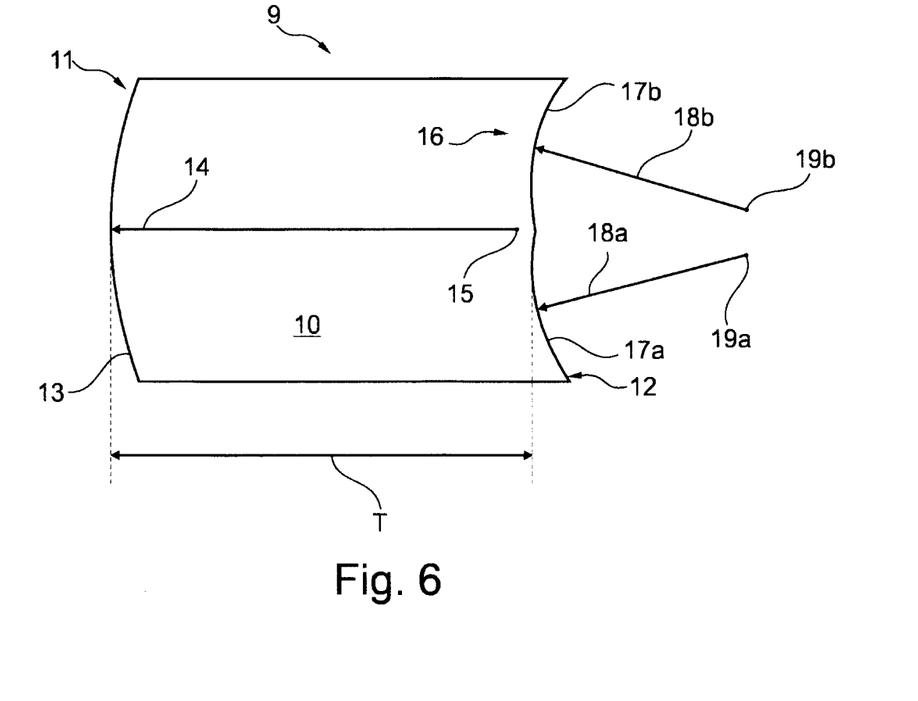
FIG. 6 a side view of a first embodiment of separating means of a device according to the invention.

FIG. 6 shows a first embodiment of separating means 9 of a device according to the invention. The separating means 9 are formed by a transparent substrate 10 which has an entrance face 11 and an exit face 12 for the laser beam or the laser radiation.

A convex lens 13, in particular a convex cylindrical lens with a cylinder axis extending into the drawing plane of FIG. 6, is formed on the entrance face 11. The lens 13 is in the form of a circular arc having a radius indicated by the arrow 14 and an origin indicated by the point 15.

A lens array 16 with two concave lenses 17a, 17b, in particular two concave cylindrical lenses with cylinder axes extending into the drawing plane of FIG. 6, is formed on the exit face 12. The lenses 17a, 17b are each formed by a circular arc having radii indicated by the arrows 18a, 18b and origins indicated by the points 19a, 19b. The origins of the circular arcs for the lenses 17a, 17b are spaced from each other in a direction perpendicular to the optical axis 20.

The depth T of the substrate 10 (see FIG. 6) may for, example, be 2.127 mm. The radius of the convex lens 13 may, for example, be 2.0575 mm. The radii of the concave lenses 17a, 17b may each be 1.097 mm. The spacing between the origins of the radii of the concave lenses 17a, 17b is 0.2 mm in a direction that extends in FIG. 6 from the top to the bottom.

Figure 7:
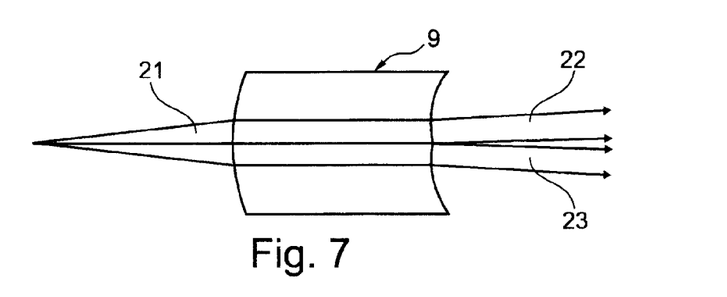
FIG. 7 schematically, the splitting of a laser beam by the separating means according to FIG. 6.

FIG. 7 shows how laser radiation 21 is split by the separating means into two divergent partial beams 22, 23.

The separating means 9 are particularly suitable for the laser radiation emitted from a laser diode bar.

Figure 8:
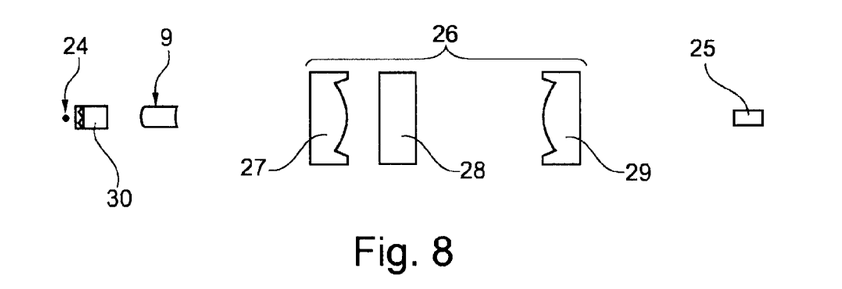
FIG. 8 a side view of a first embodiment of a device according to the invention with the separating means according to FIG. 6.
Figure 9:
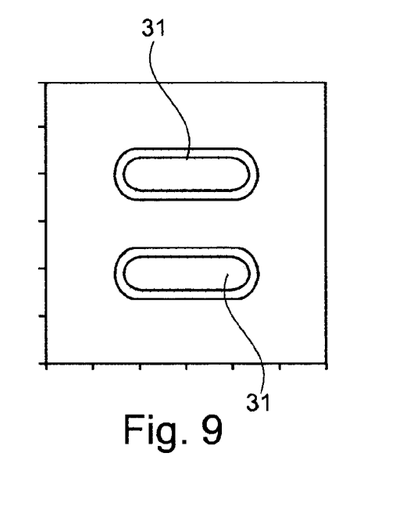
FIG. 9 the intensity distribution generated on the entrance face of an optical fiber by the device according to FIG. 8.
Figure 10:
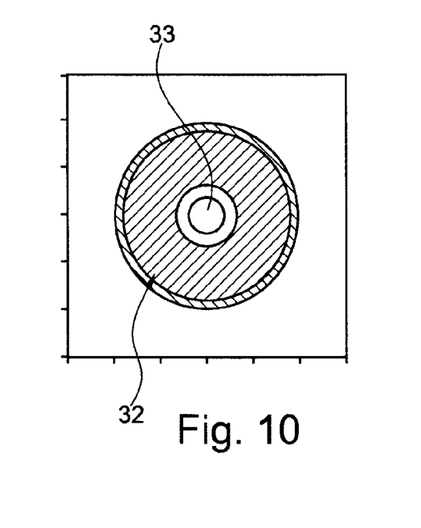
FIG. 10 the intensity distribution according to FIG. 9 after passage of the laser light through the optical fiber.

FIG. 8 shows a device according to the invention constructed with the separating means 9. The device can introduce the laser radiation from a laser diode bar 24 into an optical fiber 25 having a length of, for example, 50 mm. The optical fiber 25 may also be longer or shorter. To this end, the device includes optical means 26 capable of focusing the two partial beams exiting from the separating means 9 onto the entrance face the optical fiber 25. The optical means 26 each have crossed cylindrical lenses 27, 28, 29 operating as focusing means. Alternatively or in addition to the cylindrical lenses 27, 28, 29 which provide focusing, lens arrays operating as homogenizing means may be provided.

FIG. 8 shows the laser diode bar 24 and an optical system 30 for collimation and optionally rotation of the laser radiation emitted from the individual emitters of the laser diode bar. A comparable optical system is described in EP 1 006 382 A1 and is hereby incorporated in the present description by reference.

Two spaced-apart stripes 31 of the laser radiation are applied by the optical means 26 onto the entrance face of the optical fiber. After passage through the optical fiber 25, a laser beam with an M-profile 32, which clearly has an intensity minimum 33 in the center of the laser beam, is generated at the exit of the optical fiber 25.

Figure 11:
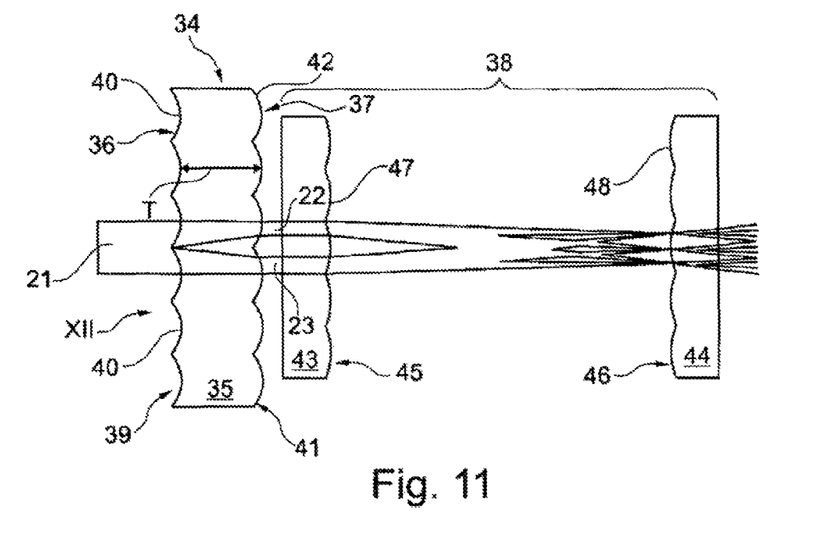
FIG. 11 a side view of a second embodiment of a device according to the invention with exemplary beam paths.

The device illustrated in FIG. 11 is suitable for introducing into a single optical fiber laser light emitted from more than one laser diode bar, for example from five or ten laser diode bars. The device includes separating means 34 formed by a transparent substrate 35 which has an entrance face 36 and one exit face 37 for the laser radiation. The device also includes optical means 38, in particular for homogenizing the laser radiation.

A first lens array 39 with concave lenses 40, in particular concave cylindrical lenses with cylinder axes extending into the drawing plane of FIG. 11, is formed on the entrance face 36. A second lens array 41 with convex lenses 42, in particular convex cylindrical lenses with cylinder axes extending into the drawing plane of FIG. 11, is formed on the exit face 37. A lens 40 of the first lens array 39 is arranged opposite a respective lens 42 of the second lens array 41 in one-to-one correspondence.

The depth T of the substrate 35 (see FIG. 11) may be, for example, about 5 mm. More particularly, the depth T of the substrate between the entrance face and the exit face may be defined by the following equation:

$$T = |f_1 - f_2| \cdot n$$

wherein $f_1$ is the focal length of the lenses 40 of the first lens array 39, $f_2$ is the focal length of the lenses 42 of the second lens array 41, and n is the refractive index of the at least one substrate 35.

Overall, the individual lenses 40, 42 opposing each other across the depth T of the substrate 35 form a plurality of Galilean telescopes. The magnification of the light passing from left to right in FIG. 11 is between about 0.7 and 0.9.

Accordingly, there is a reduction in the cross-section which causes the exemplary laser radiation 21 entering from the left in FIG. 11 to be split into two partial beams 22 23 after passing through the separating means 34.

The optical means 38 include two spaced-apart substrates 43, 44, with a respective lens array 45, 46 formed of lenses 47, 48, preferably cylindrical lenses, arranged on each of the substrates 43, 44. The cylinder axes of the lenses 47, 48 extend into the drawing plane of FIG. 11. The lens arrays 45, 46 are spaced from each other by a distance equal to the focal length of the lenses 48 of the lens array 46. The lens arrays 45, 46 operate thus as homogenizing means in a known fashion.

The laser radiation should be comparatively closely packed at the output of the homogenizing means formed by the lens arrays 45, 46, so that as much brightness as possible can be introduced, for example, into an optical fiber. The focal length of the lenses 48 of the lens array 46 should be smaller than the quotient of the pitch (distance between centers) of the lenses 40 of the first lens array 39 and the divergence of the entering laser radiation 21.

For example, the divergence of the entering laser radiation 21 may be equal to about 0.01 rad. Furthermore, the pitch of the lenses 40 of the first lens array 39 may be equal to about 1 mm. The focal length of the lenses 48 of the lens array 46 should then be between about 70 mm and 100 mm.

The spacing between the substrate 35 and the substrate 43 may be about twice the pitch, i.e. about 1 mm to 3 mm.

Furthermore, the optical means 38 may include focusing means arranged after the lens arrays 45, 46 and operating as homogenizing means, or also operating as homogenizing means in lieu of the lens arrays 45, 46, such as the cylindrical lenses 27, 28, 29 according to FIG. 8 which operate as homogenizing means.

Figure 12:
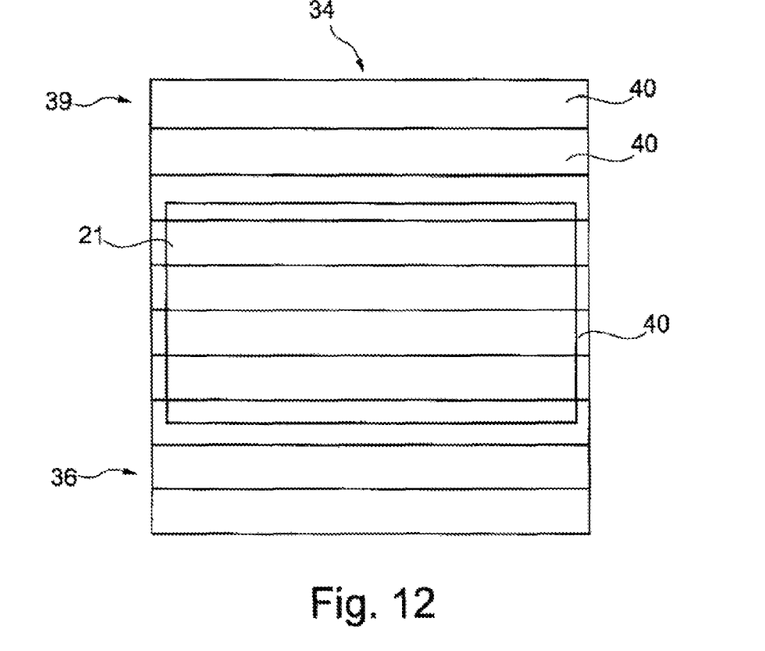
FIG. 12 a schematic view according to the arrow XII in FIG. 11.

The entrance face 36 of the separating means 34 may be constructed as indicated in FIG. 12. The incident laser radiation 21 is indicated here by a small rectangle.

Figure 13:
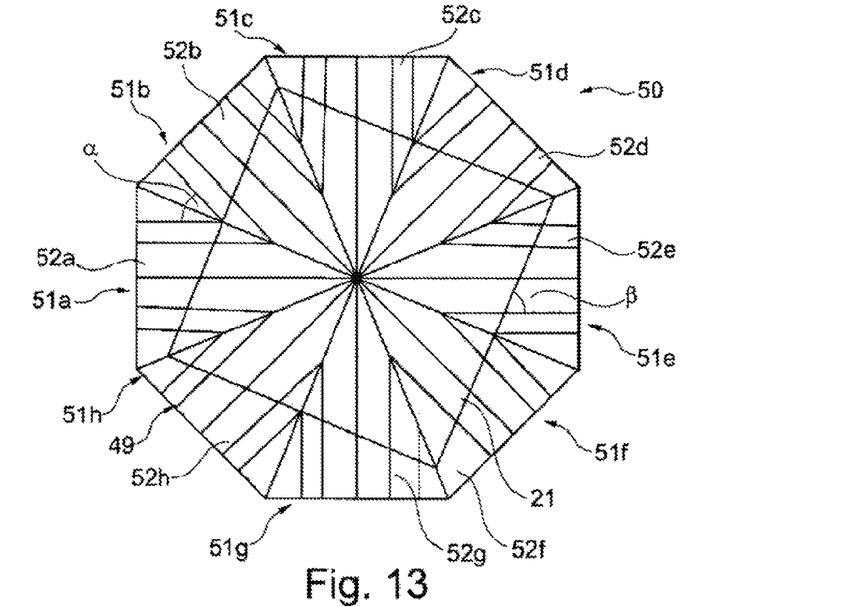
FIG. 13 a view according to FIG. 12 onto a third embodiment of a device according to the invention.

However, according to another embodiment of the present invention, the entrance and the exit face of the separating means may also be segmented, as shown in FIG. 13.

FIG. 13 shows an embodiment wherein the entrance face 49 and the unillustrated exit face of the separating means 50 are divided into eight segments. A corresponding lens array 51a, 51b, 51c, 51d, 51e, 51f, 51g, 51h of lenses 52a, 52b, 52c, 52d, 52e, 52f, 52g, 52h is arranged on each of these segments of the entrance face 49 and the exit face, wherein the lenses are preferably each formed as cylindrical lenses. The lenses 52a, 52b, 52c, 52d, 52e, 52f, 52g, 52h of the entrance face and the unillustrated lenses of the exit face may be formed like those in FIG. 11 and may be spaced apart from each other.

The cylinder axes of neighboring lenses 52a, 52b, 52c, 52d, 52e, 52f, 52g, 52h hereby enclose with each other an angle of α=45°. By employing these segmented separating means 50, the laser radiation of a larger number of laser diode bars can be introduced into one and the same optical fiber. The incident laser radiation 21 is also indicated in FIG. 13 by a square. The sides of this square each enclose with the cylinder axes of the lenses 52a, 52b, 52c, 52d, 52e, 52f, 52g, 52h an angle of β=67.5°.

It would also be possible to provide more or fewer than eight segments. The angle β between the sides of the square, which corresponds to the incident laser radiation 21 and the cylinder axes of the lenses 52a, 52b, 52c, 52d, 52e, 52f, 52g, 52h may also have a different value. For example, the angle β could also be 0° and/or 45° and/or 90°.

Figure 14:
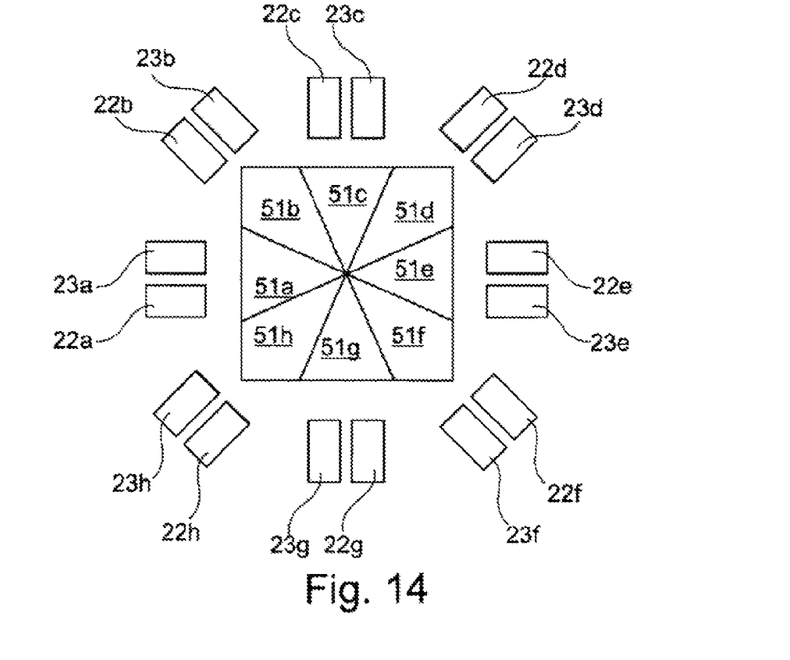
FIG. 14 schematically, the splitting of the laser beam by the third embodiment of a device according to the invention.
Figure 15:
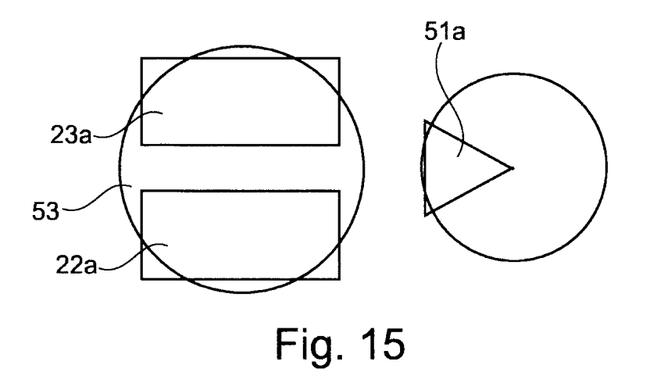
FIG. 15 a detail of the splitting shown in FIG. 14.

FIG. 14 illustrates schematically the generation of a plurality of partial beams 22a, 22b, 22c, 22d, 22e, 22f, 22g, 22h, 23a, 23b, 23c, 23d, 23e, 23f, 23g, 23h through segmentation after the separating means 50. FIG. 15 shows the partial beams 22a, 22b formed by the lens arrays 51a of a segment and incident on the entrance face 53 of an optical fiber.

Figure 16:
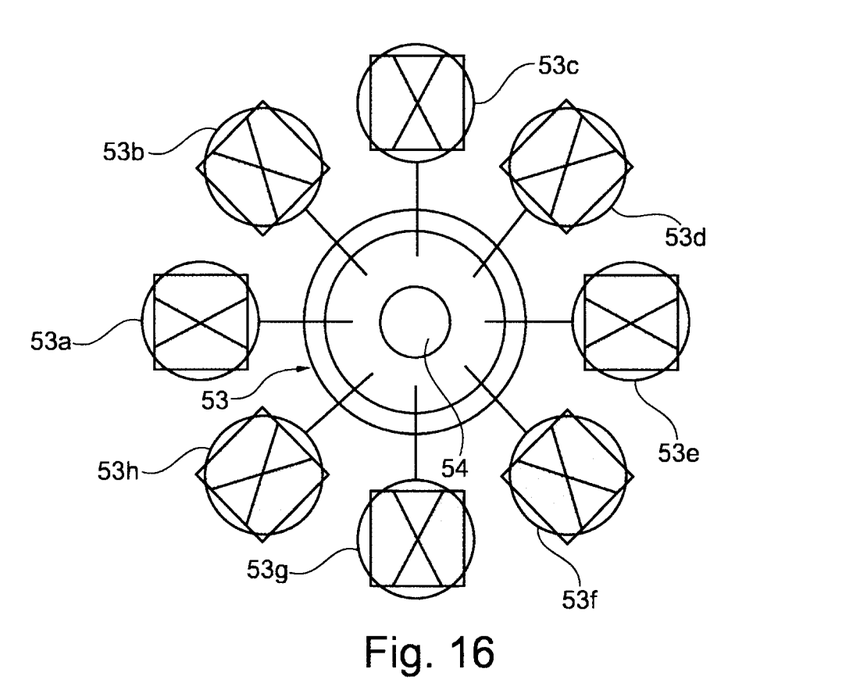
FIG. 16 the superposition of the intensity profiles of the portions of the laser radiation incident on the entrance face of the optical fiber after the splitting.

FIG. 16 illustrates the superposition of all partial beams 22a, 22b, 22c, 22d, 22e, 22f, 22g, 22h, 23a, 23b, 23c, 23d, 23e, 23f, 23g, 23h at the entrance face 53 of the optical fiber. The outside part of FIG. 16 shows how the partial beams 22a, 22b, 22c, 22d, 22e, 22f, 22g, 22h, 23a, 23b, 23c, 23d, 23e, 23f, 23g, 23h contribute to the intensity distribution in the individual regions 53a, 53b, 53c, 53d, 53e, 53f, 53g, 53h of the entrance face 53. It is clearly apparent that an intensity distribution equivalent to an M-profile is already produced at the entrance face 53 of the optical fiber. In particular, the minimum 54 in the center of the entrance face 53 is clearly visible.

This M-profile can be even more homogeneous after passage through the optical fiber.

The invention claimed is:

1. A device for converting laser radiation into laser radiation with an M-profile, comprising;
   a separation device configured to split the laser radiation into at least two partial beams, which propagate at least in sections or partially in different directions or in sections offset from each other,
   an optical device configured to introduce the at least two partial beams into a working plane and/or which at least in sections superimpose the at least two partial beams in the working plane,
   wherein the separation device comprises at least one lens array with at least two lenses,
   wherein the device comprises an optical fiber into which the at least two partial beams at least partially enters, with laser radiation with an M-profile then exiting at the output of the optical fiber.

2. The device according to claim 1, wherein the separation device comprises at least one substrate which has an entrance face and an exit face for the laser radiation, wherein the separation device comprises at least one first lens array and at least one second lens array having each at least two lenses, wherein the at least one first lens array is arranged on the entrance face of the at least one substrate and the at least one second lens array is arranged on the exit face of the at least one substrate.

3. The device according to claim 2, wherein the at least one substrate has a depth (T) between the entrance face and the exit face and is defined by $$T=|f_1-f_2|\cdot n$$

wherein $f_1$ is a first focal length of the lenses of the at least one first lens array, $f_2$ is a second focal length of the lenses of the at least one second lens arrays, and n is a refractive index of the at least one substrate.

4. The device according to claim 1, wherein the separation device comprises at least one substrate which has an entrance face and an exit face for the laser radiation, wherein a Galilean telescope or a plurality of Galilean telescopes are formed by the entrance face and the exit face of the at least one substrate.

5. The device according to claim 1, wherein the lenses of the at least one lens array are cylindrical lenses.

6. The device according to claim 5, wherein the separation device comprises at least one substrate which has an entrance face and an exit face for the laser radiation, wherein the entrance face and/or the exit face comprise at least two different segments, wherein cylinder axes of the lenses in a first of the segments are oriented different from cylinder axes of the lenses in a second of the segments.

7. The device according to claim 6, further comprising an optical arrangement including two spaced-apart substrates, with a respective lens array formed of lenses, and further comprising a homogenizing device.

8. The device according to claim 1, wherein the optical device comprises a focusing device configured to deflect and/or focus the at least two partial beams onto an entrance face of the optical fiber.

9. The device according to claim 1, wherein the separation device is adjusted to split the laser radiation into the at least two partial beams.

10. The device according to claim 1, wherein the separation device is adjusted to split the laser radiation into the at least two partial beams offset from each other.

11. The device according to claim 1, wherein the separation device comprises at least one substrate which has an entrance face and an exit face for the laser radiation, wherein the at least one lens array is arranged on the exit face of the at least one substrate and a flat surface or a single lens is arranged on the entrance face of the at least one substrate.

* * * * *